United States Patent
Noble

(10) Patent No.: US 9,137,589 B2
(45) Date of Patent: Sep. 15, 2015

(54) NETWORK DEVICE MANAGEMENT USING AN RFID SYSTEM

(75) Inventor: Gayle L. Noble, Boulder Creek, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 1366 days.

(21) Appl. No.: 12/234,375

(22) Filed: Sep. 19, 2008

(65) Prior Publication Data

US 2009/0079544 A1 Mar. 26, 2009

Related U.S. Application Data

(60) Provisional application No. 60/973,864, filed on Sep. 20, 2007.

(51) Int. Cl.
*H04Q 5/22* (2006.01)
*H04Q 9/00* (2006.01)

(52) U.S. Cl.
CPC ............. *H04Q 9/00* (2013.01); *H04Q 2209/47* (2013.01); *H04Q 2209/753* (2013.01)

(58) Field of Classification Search
CPC ............ G06K 7/0008; G06K 19/0723; G06K 19/07749; G06K 2017/0045; G07C 9/00111; H04Q 2209/47; H04Q 2209/753; H04Q 9/00
USPC ........... 340/10.1, 572.4, 539.1, 541; 235/385; 709/203; 600/437; 439/49; 422/119; 348/143; 455/41.2
See application file for complete search history.

(56) References Cited

U.S. PATENT DOCUMENTS

| | | | | |
|---|---|---|---|---|
| 5,949,335 A | * | 9/1999 | Maynard | 340/572.1 |
| 6,373,389 B1 | * | 4/2002 | Przygoda et al. | 340/572.4 |
| 6,380,894 B1 | * | 4/2002 | Boyd et al. | 342/450 |
| 2002/0019725 A1 | * | 2/2002 | Petite | 702/188 |
| 2003/0046339 A1 | * | 3/2003 | Ip | 709/203 |
| 2004/0212500 A1 | * | 10/2004 | Stilp | 340/541 |
| 2005/0128293 A1 | * | 6/2005 | Wilsey et al. | 348/143 |
| 2006/0107307 A1 | * | 5/2006 | Knox et al. | 726/2 |
| 2006/0140374 A1 | * | 6/2006 | Light et al. | 379/201.01 |
| 2006/0148279 A1 | * | 7/2006 | German et al. | 439/49 |
| 2007/0013510 A1 | * | 1/2007 | Yamada et al. | 340/539.1 |
| 2007/0083111 A1 | * | 4/2007 | Hossack et al. | 600/437 |
| 2007/0176782 A1 | * | 8/2007 | Mohalik | 340/572.1 |
| 2008/0131332 A1 | * | 6/2008 | Nguyen et al. | 422/119 |
| 2008/0177969 A1 | * | 7/2008 | Miriyala et al. | 711/170 |

* cited by examiner

*Primary Examiner* — Steven Lim
*Assistant Examiner* — Sisay Yacob
(74) *Attorney, Agent, or Firm* — Maschoff Brennan

(57) ABSTRACT

Network device management using an RFID system. In one example embodiment, a method of determining the status of a network device may include communicating between a host computing device and a network device, communicating between the host computing device and an RFID reader, storing one or more status parameters of the network device in an RFID tag that is coupled to the network device, sending an interrogation signal from the RFID reader to an RFID tag, receiving the one or more status parameters from the RFID tag at the RFID reader, receiving the one or more status parameters from the RFID reader at the host computing device, storing the one or more status parameters in a database at the host computing device, and displaying the one or more status parameters to a user that is located remote from the predetermined location of the network device.

12 Claims, 2 Drawing Sheets

NETWORK DEVICE MANAGEMENT USING AN RFID SYSTEM

CROSS-REFERENCE TO RELATED APPLICATIONS

This application claims the benefit of U.S. Provisional Patent Application Ser. No. 60/973,864 filed Sep. 20, 2007, which is hereby incorporated by reference in its entirety.

BACKGROUND OF THE INVENTION

1. The Field of the Invention

The present invention relates to monitoring locations of electronic devices and to monitoring the location of electronic devices using RFID systems in particular.

2. The Relevant Technology

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. Such networks can span huge areas, many labs, and sometimes multiple buildings and include large numbers of network devices. Presently, when a communication failure occurs within the network, it can be difficult to determine whether the equipment failure is hardware or software related. Further, locating a single, selected network device can be difficult due to the large number of network devices distributed in several locations.

The subject matter claimed herein is not limited to embodiments that solve any disadvantages or that operate only in environments such as those described above. Rather, this background is only provided to illustrate one exemplary technology area where some embodiments described herein can be practiced.

BRIEF SUMMARY OF THE INVENTION

A system for tracking network devices includes a host computing device, a radio frequency identification (RFID) tag secured to at least one of the network devices, and a reader configured to communicate with the RFID tag to receive device parameters from the RFID tag, the reader being configured to transmit the device parameters to the host computing device.

A method of determining the status of a network device may include communicating between a host computing device and a network device over a wide area network, communicating between the host computing device and an RFID reader over the wide area network with the RFID reader being physically positioned within radio frequency communication range of a predetermined location of the network device, storing one or more status parameters of the network device in an RFID tag that is coupled to the network device with the one or more status parameters including a unique identifier of an additional network device with which the network device is currently in communication, sending an interrogation signal from the RFID reader to an RFID tag that is coupled to the network device, receiving the one or more status parameters from the RFID tag at the RFID reader in response to the interrogation signal, receiving the one or more status parameters from the RFID reader at the host computing device, storing the one or more status parameters in a database at the host computing device, and displaying the one or more status parameters to a user that is located remote from the predetermined location of the network device.

A method of controlling access to a network may include detecting that a new network device is attempting to communicate with an established network device over a wide area network, communicating between a host computing device and an RFID reader over the wide area network with the RFID reader being physically positioned within radio frequency communication range of a location of the new network device, sending an interrogation signal from the RFID reader to an RFID tag that is coupled to the new network device, receiving a parameter corresponding to the new network device from the RFID tag at the RFID reader in response to the interrogation signal, receiving the parameter from the RFID reader at the host computing device, analyzing the parameter to determine whether the new network device is technologically compatible with the established network device, granting access to the new network device to communicate with the established network device if it is determined that the new network device is technologically compatible with the established network device, and denying access to the new network device to communicate with the established network device if it is determined that the new network device is not technologically compatible with the established network device.

Additional features and advantages of the invention will be set forth in the description which follows, and in part will be obvious from the description, or can be learned by the practice of the invention. The features and advantages of the invention can be realized and obtained by means of the instruments and combinations particularly pointed out in the appended claims. These and other features of the present invention will become more fully apparent from the following description and appended claims, or can be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Devices, systems, and methods are provided for monitoring at least one status parameter of at least one network device using a radio frequency identification tag (RFID tag) and a reader. In at least one example, RFID tags can be secured to network devices. One or more reader can be located at desired locations, such as monitoring locations. The readers can periodically communicate with the RFID tags to thereby track the location of the network devices within each of the areas. In another example, RFID tags can also be secured to a network device and/or a device assembly. The RFID tags can include information that a host computing device is able to analyze to determine if a network device is authentic and/or compatible with other selected network devices. Such a configuration can help ensure that the system is able to and/or should support the network devices.

Figure 1:
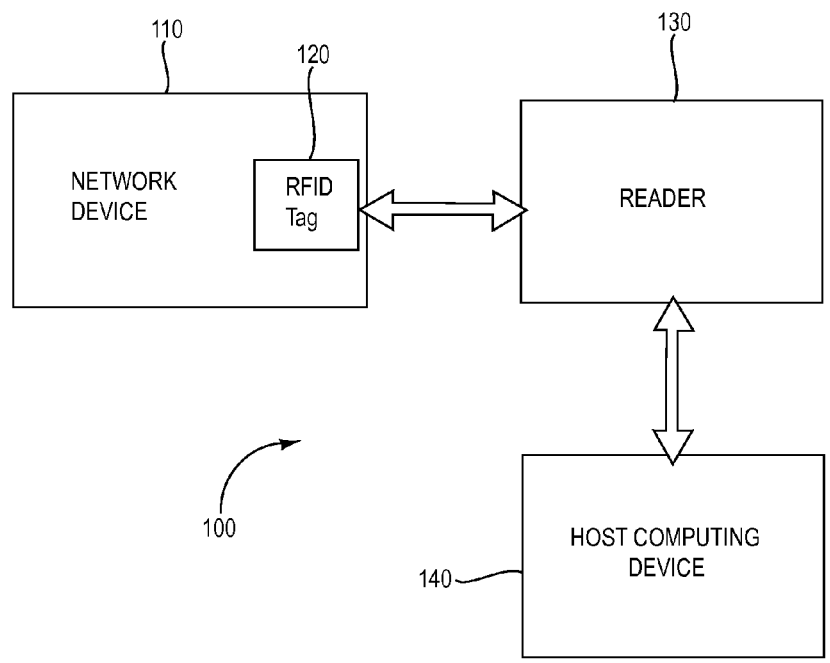
FIG. 1 is a schematic diagram of a system for tracking network devices according to one example.

FIG. 1 is a schematic diagram of a system 100 for tracking various parameters of a network device 110. The system generally includes a radio frequency identification (RFID) tag 120, a reader 130, and a host computing device 140. The reader 130 interacts with the RFID tag 120 through radio frequency communication. In at least one example, the RFID tag 120 receives a radio frequency transmission from the reader 130 and transmits information to the reader 130 in response to receipt of the radio frequency transmission.

The RFID tag 120 can be active or passive. If the RFID tag 120 is passive, the RFID tag 120 can be powered by the radio frequency transmission. If the RFID tag 120 is active, the RFID tag 120 can include an internal power source. In either case, the power discussed above can be used to allow the RFID tag 120 to transmit one or more parameters associated with the network device 110 to the reader 130. Such parameters can include information that can be used to track such information as the device characteristics that can include information related to serial numbers, device type, device manufacturer, or other unique device identifying characteristics; the location of the device such as network location and other devices with which the transmitting device is interacting; and/or environmental conditions such as temperature. Such parameters can provide an indication of the status of the corresponding network device 110. The RFID tag 120 can monitor various other parameters as desired and transmit the parameters to the reader 130 as discussed above.

One or more readers 130 can communicate with any number of RFID tags 120. In at least one example, a selected number of readers are located in selected areas to track the status of network devices 110 in that area. In other examples, the reader 130 can be coupled to other network devices that interact with the network device 110. In other examples, the reader can be separately located. Accordingly, the reader 130 can have various configurations. In any case, the reader 130 can be configured to receive device parameters from the RFID tag 120.

In at least one example, the reader 130 then transmits the information to a host computing device 140, such as a server. The host computing device 140 can then store the information in a storage device, such as a database. The host computing device 140 can allow a user to view the information stored in the database related to the network device 110 so the user can quickly determine status parameters of the network device, such as location.

Determining the location of a network device can allow a user or administrator to diagnose whether a communication failure within the system related to the network device 110 is an equipment failure or due to some other factor. One example of an equipment failure can include the inability of the host computing device 140 or other device to connect to the network device 110. In at least one example, the network device 110 can be a probe.

Probes or other monitors can be devices that are connected (either directly or indirectly) to the network. Each of these data probes preferably monitor the physical data present on the network medium and, in a preferred embodiment, generate discrete intervals of data. The probes then analyze these data intervals, and identify specific "attributes" of the network data. These attributes can be certain characteristic or statistical information that relates to the monitored network data. These attributes are generated in the form of "metrics," which are discrete data units. For example, in an SAN environment, each metric is "storage I/O" centric, and contains attributes of multi-interval storage I/O transactions between devices on the network. In addition, the metrics can contain attributes of instantaneous events that can occur on the network.

Metrics can be generated at the data probes in substantially real time; that is, the probes are able to continuously generate metric information about the network traffic as fast as the traffic occurs within the network. In at least one example, the probe accesses the network traffic by way of a portal. The portal can be implemented in software on a host computing device.

If the host computing device 140 is unable to connect to the probe, the system 100 can cause the reader 130 to send out an interrogation signal to determine if the RFID tag 120 and thus the associated the network device 110, in this case a probe; is physically present at the selected location. If the RFID tag 120 belonging to the network device 110 responded, the host computing device 140 would then be able to determine that the network device 110 had some sort of equipment failure rather than the host computing device 140 having a programming error.

A similar technique can be used in diagnosing a communication failure between a probe and another network device. For example, the RFID tag 120 can allow a user to diagnose a communication failure between the probe and a monitoring device, such as a rover.

Rovers can be devices that are configured to "rove" between several network links that are coupled to the probe, such as by way of a traffic access port. Accordingly, the system 100 can be able to determine if the probe and/or the rover are present. Such a determination can allow administrators and/or technicians some degree of certainty that the communication failure is due to an equipment failure rather than misplaced equipment.

Figure 2:
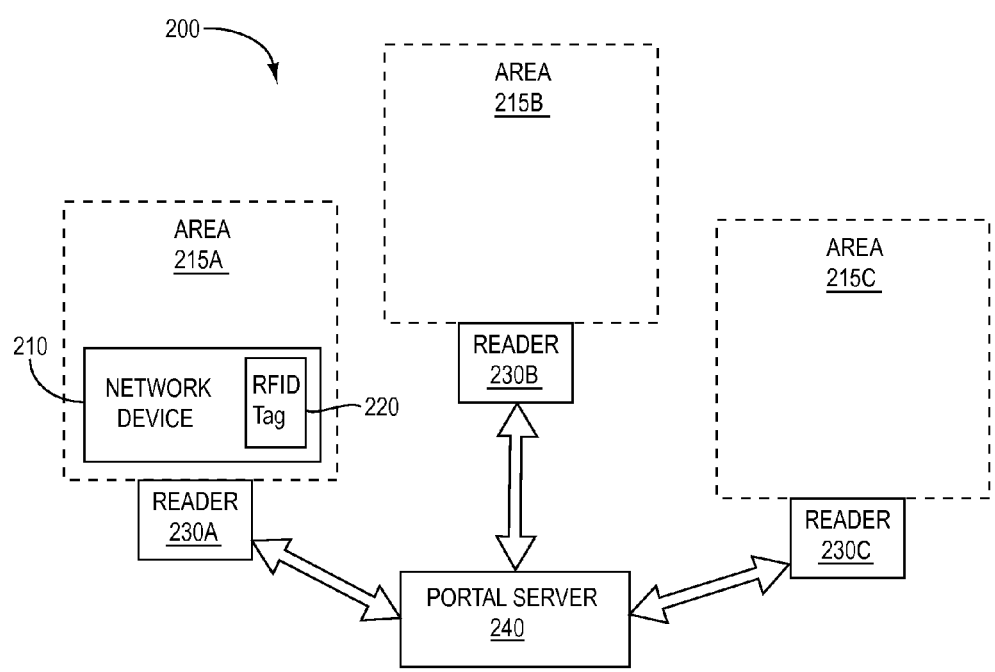
FIG. 2 is a schematic diagram of a system for tracking network devices according to another example.

FIG. 2 is a schematic diagram illustrating a system 200 for tracking one or more network devices 210 at a variety of areas 215A-215C. The areas 215A-215C can include various locations in which different network devices can be located. The network device 210 can be part of a single large network, such as an enterprise network. Accordingly, the areas 215A-215C can correspond to locations such as different labs, separate buildings and/or other different locations. The areas 215A-215C can also be joined, such that the locations are separated by designation rather than being separated physically.

In any case, in the illustrated example, readers 230A-230C are associated with the areas 215A-215C. For ease of reference, area 215A will be discussed with reader 230A. The reader 230A can be configured to transmit a signal, such as an interrogation signal, to the area 215A. The interrogation signal can be a signal that instructs an RFID tag 220 in a network device 210 to transmit desired information back to the reader 230A. For example, the interrogation signal can cause the RFID tag 220 to transmit unique device information, such as a serial number or other unique device information back to the reader 230A. The RFID tag 220 can also transmit other parameters back to the reader 230A as discussed above.

This information can then be sent to a portal server 240, which in turn logs the information, such as in a database. The information can be sent from the readers 230A-230C to the portal server 240 using wired and/or wireless communication.

In at least one example, the location of the network device 210 can be established by determining which of the readers 230A-230C received the transmission from the RFID tag 220. In particular, each reader 230A-230C can be configured to communicate with devices within the corresponding area 215A-215C. Accordingly, determining which of the readers 230A-230C is communicating with the RFID tag 220 allows a user to determine in which area 215A-215C the network device 210 is located.

The readers 230A-230C can transmit interrogation signals periodically at desired time intervals. Accordingly, if the network device 210 is in area 215A during a first interval, reader 230A will receive the communication from the RFID tag 220. If the network device 210 is moved to area 215B, at a subsequent interval, reader 230B will receive a communication from the RFID tag 220 rather than reader 230A, thus indicating that the network device 210 is in area 230B.

In addition to periodically sending interrogation signals to determine which network devices are located in which area 215A-215C, the system 200 can be configured to track when a network device 210 enters or leaves the area 215A-215C. For example, readers 230A-230C can be located at a door or other entry/exit location of each area 215A-215C.

The readers 230A-230C can be configured to continuously transmit an interrogation signal to the area surrounding the door. The interrogation signal can be transmitted such that as a network device 210 passes the entry/exit location, such as when the network device 210 is brought into or out of the area, the RFID tag 220 communicates with the reader 230A-230C as discussed above. The readers 230A-230C can also be operatively associated with the portal server 240.

In at least one example, the portal server 240 can be configured to log when the network device 210 enters or exits an area 215A-215C. Additionally, if a device is removed from an area without authorization, the portal server 240 can be configured to notify an administrator that the network device 210 has been removed. Further, the portal server 240 can cause an alarm in the areas 215A-215C to be activated.

In at least one example, one of the areas 215A-215C can be an inventory area. The configuration described above can allow an administrator to track a network device 210 at various locations within the enterprise network once the network device 210 leaves an inventory area. Accordingly, the system 200 can make use of RFID tags 220 to track network device 210 within the network, such as within an enterprise network.

To this point, network devices with RFID tags have been described in the context of monitoring various device parameters and in monitoring and tracking the location of network devices utilizing various configurations of readers at different areas. In addition to tracking the location of network devices, RFID tags can also be utilized to help ensure network devices used with other network devices are authentic, compatible, and/or otherwise deemed appropriate.

Figure 3:
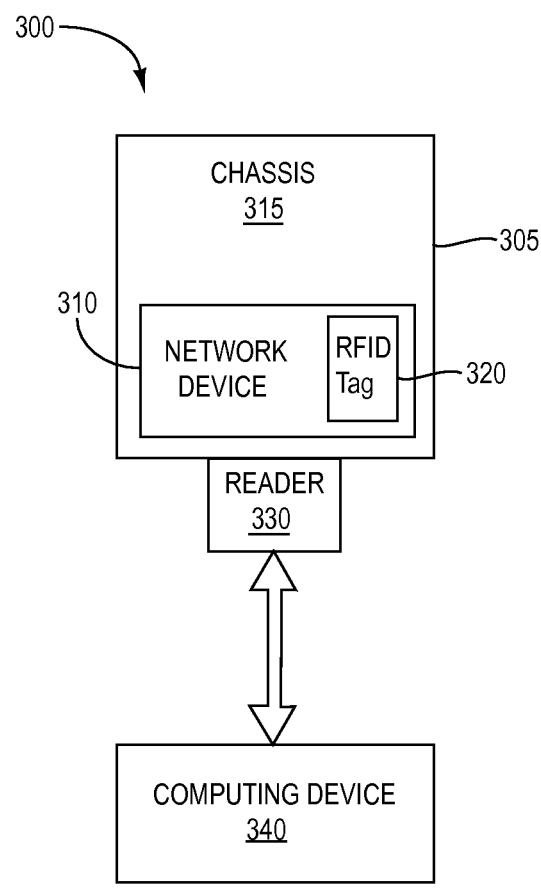
FIG. 3 is a schematic diagram of a system for tracking network devices according to yet another example.

FIG. 3 illustrates a system 300 that includes a device assembly 305 to which one or more network device 310 is coupled. In one example, the device assembly 305 includes a chassis 315 with which several network devices can be associated. For example, the network device 310 can include a chassis 315 to which a traffic access port, a fabric layer switch, a probe and/or a monitoring device can be secured. For ease of reference, a generalized network device 310 will be described.

The system 300 further includes a reader 330. The reader 330 can be in communication with a host computing device 340, such as a host server. The RFID tag 320 can be configured to transmit device parameters to the reader 330, such as unique identifying characteristics of the network device 310. As will be discussed in more detail below, such a configuration can allow the system 300 to authenticate network devices as well as to help ensure that network devices to be used together are compatible.

The chassis 315 can be operatively associated with the host computing device 340 by way of a portal as described above. Further, the portal can at least partially control connections between the network device 310 to other network devices within the system 300. The determination of whether the host computing device 340 allows a connection can be based, at least in part, on whether the host computing device 340 is able to verify that the network device 310 is authentic and/or compatible with other selected network devices.

For example, the reader 330 can communicate with the RFID tag 320 to receive device parameters as described above. The reader 330 can then send the received device parameters to the host computing device 340, such as by way of the portal.

The host computing device 340 can then determine whether to allow the computing device 310 to access the network by way of the portal based on the received device parameters. More specifically, in at least one example, the host computing device 340 can determine if the received device parameters indicate that the network device 310 is from a desired manufacturer or otherwise has device parameters that the host computing device 340 recognizes as corresponding to a network device that should be allowed access to the network by way of the portal.

One such device parameter can include the serial number of the network device which can be recognized by the host computing device 340 as authentic. Any number of device parameters can be transmitted by the RFID tag to the reader to indicate that the network device is authentic or should otherwise be allowed to access the network.

The RFID tag can be secured to a network device at any time, such as when the network device is shipped from a supplier to an end user. In one example, the reader 330 can be a modem type device that is able to communicate over the network to the host computing device 340.

The embodiments described herein can include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein can be implemented as objects or processes that execute on the computing system (e.g., as separate threads). While the system and methods described herein are preferably implemented in software, implementations in hardware or a combination of software and hardware are also possible and contemplated. In this description, a "computing entity" can be any computing system as previously defined herein, or any module or combination of modulates running on a computing system.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of controlling access to a network, the method comprising:
   detecting that a new network device is attempting to communicate with an established network device over a wide area network;
   communicating between a host computing device and an RFID reader over the wide area network, the RFID reader being physically positioned within radio frequency communication range of a location of the new network device;
   sending an interrogation signal from the RFID reader to an RFID tag that is coupled to the new network device;
   receiving a parameter corresponding to the new network device from the RFID tag at the RFID reader in response to the interrogation signal;
   receiving the parameter from the RFID reader at the host computing device;
   analyzing the parameter to determine whether the new network device is technologically compatible with the established network device;
   granting access to the new network device to communicate with the established network device if it is determined that the new network device is technologically compatible with the established network device; and
   denying access to the new network device to communicate with the established network device if it is determined that the new network device is not technologically compatible with the established network device.

2. The method of claim 1, wherein the parameter corresponding to the new network device includes a serial number of the new network device.

3. The method of claim 1, wherein the parameter corresponding to the new network device includes a device type of the new network device.

4. The method of claim 1, wherein the parameter corresponding to the new network device includes a device manufacturer of the new network device.

5. The method of claim 1, wherein the new network device is a probe and the established network device is a rover.

6. The method of claim 1, further comprising:
   in response to receiving the parameter at the host computing device, determining that the new network device is currently located at the predetermined location.

7. A method of determining the status of a network device, the method comprising:
   communicating between a host computing device and a network device over a wide area network;
   communicating between the host computing device and an RFID reader over the wide area network, the RFID reader being physically positioned within radio frequency communication range of a predetermined location of the network device;
   storing one or more status parameters of the network device in an RFID tag that is coupled to the network device, the one or more status parameters including a unique identifier of an additional network device with which the network device is currently in communication;
   sending an interrogation signal from the RFID reader to an RFID tag that is coupled to the network device;
   receiving the one or more status parameters from the RFID tag at the RFID reader in response to the interrogation signal;
   receiving the one or more status parameters from the RFID reader at the host computing device;
   storing the one or more status parameters in a database at the host computing device; and
   displaying the one or more status parameters to a user that is located remote from the predetermined location of the network device.

8. The method of claim 7, further comprising:
   detecting an inadvertent communication failure between the host computing device and the network device over the wide area network; and
   in response to receiving the one or more status parameters at the host computing device, determining that the inadvertent communication failure is not due to the network device having gone missing from the predetermined location of the network device.

9. The method of claim 7, wherein the network device is a probe.

10. The method of claim 7, further comprising:
    in response to receiving the one or more status parameters at the host computing device, determining that the network device is currently located at the predetermined location.

11. The method of claim 7, wherein:
the one or more status parameters further include a current physical location of the network device.

12. The method of claim 11, wherein:
the one or more status parameters further include a current environmental condition at the current physical location of the network device.

\* \* \* \* \*